March 25, 1947.   T. BARISH   2,417,857
DISC BRAKE
Filed March 1, 1946
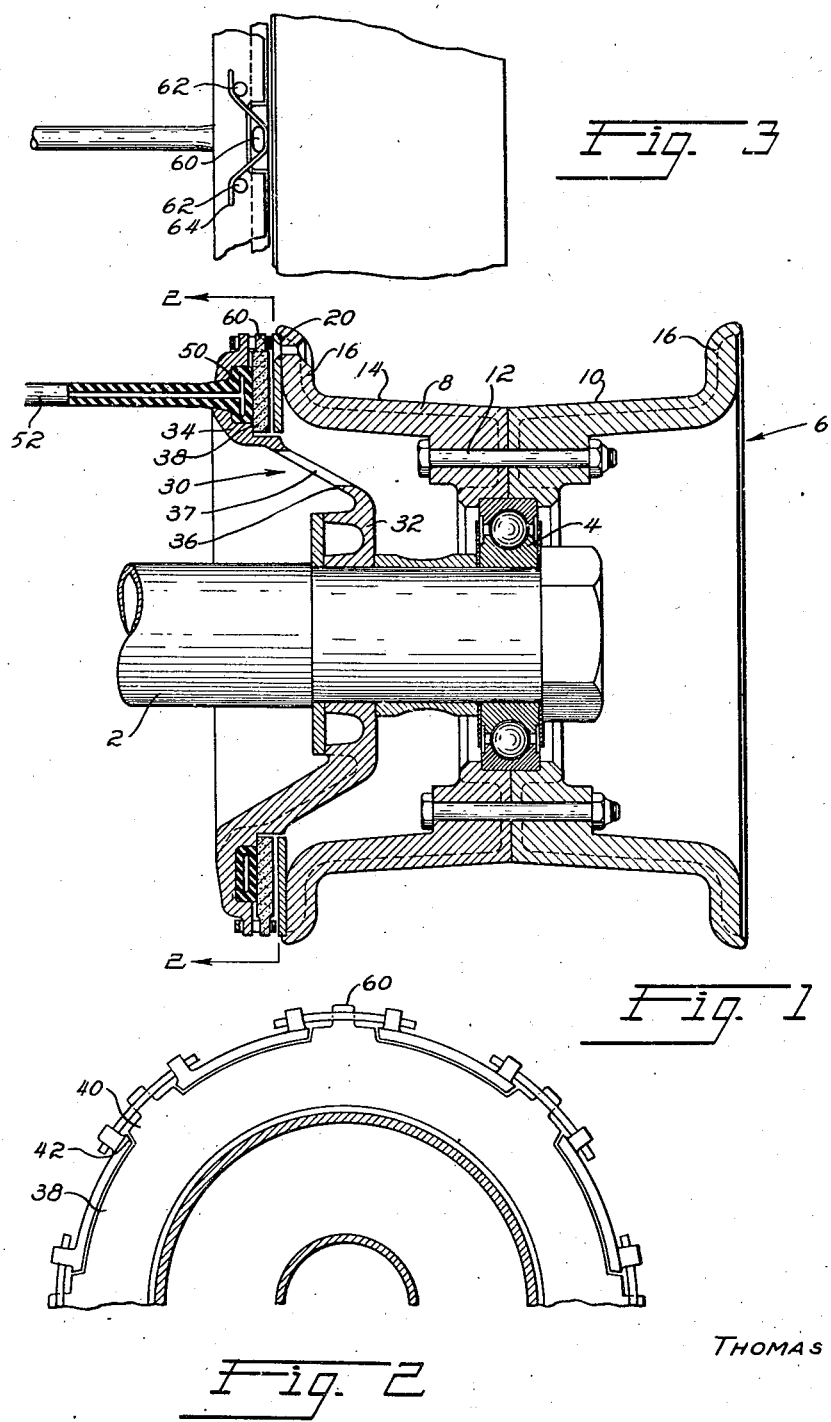
Inventor
THOMAS BARISH
By
Scrivener & Parker
Attorneys Patented Mar. 25, 1947

2,417,857

UNITED STATES PATENT OFFICE 2,417,857

DISC BRAKE

Thomas Barish, Cheverly, Md., assignor to Engineering and Research Corporation, Riverdale, Md., a corporation of Maryland Application March 1, 1946, Serial No. 651,297

2 Claims. (Cl. 188—71)

This invention relates to brakes and, more particularly, to disc brakes. Such braking devices comprise a disc connected to the wheel and rotatable therewith, a non-rotatable disc positioned adjacent and parallel to the wheel-connected disc, and some means, which may be hydraulic or mechanical in operation, for moving the discs into braking engagement with each other.

In a specific type of such braking devices the rotatable braking disc is rigidly attached to the wheel and the non-rotatable disc is moved into engagement therewith along splines or other similar means in order to effect the braking action. My invention relates particularly to brakes of this general type and it has been the principal object of this invention to provide a brake of the described type in which the non-rotatable, or fixed, disc is supported for axial movement toward and away from the rotatable disc by new and improved means which take the place of splines, bolts and similar devices. A further object has been to support the non-rotatable disc in the required manner by the return spring means which must be provided to constantly urge the fixed disc out of engagement with the rotatable or wheel-carried disc.

Another object has been to provide a braking device of the described type which is of new, improved and simplified structure and operation, utilizing a minimum number of parts which are simple and inexpensive in construction and which may be easily and quickly assembled and disassembled.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a partial cross-sectional view through an airplane wheel and brake assembly including the new and improved braking means provided by the invention;

Fig. 2 is a sectional view taken on line 2—2 of Fig. 1, and

Fig. 3 is a partial view showing the means provided by the invention for maintaining the non-rotatable disc out of engagement with the rotatable disc.

A brake according to one form of my invention is disclosed in the drawings in association with a wheel assembly comprising a fixed axle 2 on which, adjacent the outer end thereof, is keyed the inner race of a bearing 4 having a single row of balls. The outer race of the bearing is attached centrally of the web of a wheel 6 which is formed in two substantially identical cylindrical parts 8, 10, the abutting faces of which are coplanar with the centers of the balls of bearing 4. The two halves of the wheel are connected by an annular series of bolts 12 which extend through the web of the wheel. The two parts of the wheel provide a generally cylindrical tire-receiving rim 14 having axially-spaced tire-retaining flanges 16.

This invention provides novel means for stopping rotation of the wheel and such means comprise an annular disc 20 which is rigidly attached, as by rivets, to the outer face of one of the tire-retaining flanges 16. A device for supporting a brake actuator and a fixed friction disc is also provided by the invention and comprises a cast or sheet metal member denoted generally by numeral 30 and having an inner part 32 which surrounds and is rigidly attached to axle 2 and extends radially thereof, and an outer part 34 of C-shaped cross-section which is integrally connected to the central part by a conical part 36 which is provided with an annular series of apertures 37. The C-shaped part 34 is at approximately the same radial position as the wheel-carried braking member 20, has approximately the same radial extent and the open side of such C-shaped part faces the braking member 20 and is spaced axially outwardly therefrom. A disc 38, which is formed of friction material, is positioned over the open face of the C-shaped part and is provided with an annular series of projections 40 which extend radially outwardly from the outer peripheral face of the disc 38 and each of which is received within a recess 42 formed in the inner face of the upper arm of the C-shaped part 34 of the brake supporting member. Each of these recesses is of substantially the same circumferential length as the projection received within it, whereby the disc 38 is held from rotation but is permitted to move in an axial direction toward and away from the wheel-carried disc 20. An annular, expansible, hollow tube 50 is disposed within the C-shaped part 34 of the supporting device 30 and is connected through conduit 52 to a source of fluid pressure. The tube abuts the outer face of disc 38 whereby the same is moved axially toward the wheel-carried disc upon expansion of the tube.

Means are provided by the invention for constantly urging the fixed disc 38 in a direction away from the wheel-carried disc 20 and out of engagement therewith. Such means comprise a lug 60 extending radially outwardly from each of the projections 40 which form part of the fixed disc 38, and on each side of which, in circumferential directions, is a second lug 62 which extends radially outwardly from the outer face of the upper arm of the C-shaped part 34 of the brake supporting member. These lugs 62, as shown in Fig. 3, are preferably spaced axially outwardly from lug 60 for a reason which will be described. A spring device 64 which may be a substantially flat, elongated strip of spring steel, is arranged with its central part bearing on the inside of lug 60 and its end parts respectively bearing on the outsides of the lugs 62, whereby the spring is deformed, by reason of the described axial offsetting of the lugs 60, 62, to cause it to constantly urge the disc 38 in a direction away from the rotatable, wheel-carried disc 20. As shown in the drawings a plurality of assemblies of lugs and springs are provided throughout the circumferential extent of the C-shaped member 34 and disc 38. The number of these assemblies, and the strength of springs 64 may be varied in order to adjust the resistance to movement of disc 38 toward the wheel-carried disc.

In the operation of the described braking device, the fixed disc 38 is normally maintained out of engagement with the wheel-carried disc 20 by the action of the springs 64. If it is desired to stop rotation of the wheel, fluid under pressure is introduced into tube 50 through conduit 52, causing the tube to expand and force disc 38 toward and into engagement with the wheel-carried disc 20 against the force of springs 64, thereby retarding or stopping the rotation of the wheel. The spring 64 of each of the spring and lug assemblies yields to permit this movement of the fixed braking disc. Upon release of the pressure fluid the springs move the fixed brake disc 38 out of engagement with the rotatable disc, thus stopping the braking action. In all such operations, the disc 38 is permitted only an axial movement into and out of engagement with the wheel-carried disc and is held from rotary movement by the inter-engagement of the disc-carried projections 40 and the recesses 42 in the fixed brake-supporting structure.

It will be seen that the fixed braking disc is supported with respect to other parts of the brake only by the inter-engagement of the annular series of springs 64 with the lugs associated therewith, and that no other structure or means need be provided for holding the fixed brake disc in desired position.

I have thus provided a disc braking device having a minimum number of parts which are of simple and cheap construction and which may be easily and quickly assembled and disassembled. While I have described and illustrated only two embodiments of my invention it will be apparent to those skilled in the art that other embodiments, as well as modifications of those disclosed, may be made without departing in any way from the spirit or scope of the invention, for the limits of which reference must be had to the appended claims.

What is claimed is:

1. A disc brake for a wheel assembly comprising an axle and a wheel journaled thereon, comprising an annular brake disc fixedly attached to the wheel, an annular brake supporting device comprising an inner part surrounding and attached to the axle and an outer part integral therewith and being positioned adjacent said brake disc and spaced axially outwardly therefrom, a second annular brake disc positioned between said outer part and said first disc, a plurality of circumferentially spaced lugs extending radially outwardly from said second disc, two lugs extending radially outwardly from said outer part adjacent each of said disc-carried lugs and spaced circumferentially in opposite directions therefrom, and substantially flat strip of spring metal having its central part abutting and inside each disc-carried lug and its end parts abutting and outside the adjacent lugs carried by said outer part for constantly urging said second disc away from the first disc, means for moving said second disc toward and into engagement with the first disc, and means for preventing rotation of the second disc.

2. A disc brake for a wheel assembly comprising an axle and a wheel journaled thereon, comprising an annular brake disc fixedly attached to the wheel, said brake being attached at its outer periphery to the wheel and being fixed against rotary and axial movement relative thereto, an annular brake supporting device comprising an inner part surrounding and attached to the axle and an outer part having an annular axially-extending surface having a plurality of circumferentially-spaced apertures in the inner periphery thereof, a second annular brake disc positioned between said outer part and said first disc, a plurality of circumferentially-spaced members projecting radially from the outer periphery of said second disc and being respectively received within the apertures in said outer part to thereby prevent rotation of said second disc while permitting axial movement thereof toward and away from the first disc, a lug projecting radially outwardly from each of said circumferentially-spaced members extending from said second disc, said lug being smaller than said members, circumferentially-spaced lugs extending outwardly from said outer part adjacent each of said disc-carried lugs, a single spring extending around said lugs for constantly urging said second disc away from the wheel-carried disc, and means for moving said second disc toward and into engagement with the first disc.

THOMAS BARISH.

REFERENCES CITED

The following references are of record in the file of this patent:

UNITED STATES PATENTS

| Number | Name | Date |
|---|---|---|
| 1,878,854 | Hymer | Sept. 20, 1932 |
| 1,989,178 | Versluis | Jan. 29, 1935 |
| 2,371,108 | Oelkers | Mar. 6, 1945 |